United States Patent

Brown et al.

[11] 4,195,006
[45] Mar. 25, 1980

[54] AQUEOUS CAN COATINGS OF IMPROVED IMPERMEABILITY

[75] Inventors: George L. Brown, Scotch Plains; Arthur T. Spencer, New Providence, both of N.J.

[73] Assignee: Mobil Oil Corporation, New York, N.Y.

[21] Appl. No.: 854,185

[22] Filed: Nov. 23, 1977

[51] Int. Cl.$^2$ ............................................. C08L 33/02
[52] U.S. Cl. ........................... 260/29.6 TA; 426/131; 426/398; 428/463; 526/304
[58] Field of Search ............... 260/29.6 TA; 526/304; 428/463; 426/131, 398

[56] References Cited

U.S. PATENT DOCUMENTS

| | | | |
|---|---|---|---|
| 3,551,525 | 12/1970 | Wilhelm | 526/304 |
| 3,652,478 | 3/1972 | Ishii | 526/304 |
| 3,991,216 | 11/1976 | Christenson | 426/398 |
| 4,057,527 | 11/1977 | Columbus | 260/29.6 TA |
| 4,065,415 | 12/1977 | Christensen | 260/29.6 TA |

*Primary Examiner*—Paul R. Michl
*Attorney, Agent, or Firm*—Charles A. Huggett; Edward J. Trojnar; Michael G. Gilman

[57] ABSTRACT

There is disclosed a metal container containing a beverage or food having its internal surface coated with an adherent sanitary liner, the coating being a cured layer of a water-based coating composition consisting essentially of from about 5 percent to about 60 percent by weight of an amine-neutralized or partially neutralized interpolymer formed in the presence of a vinyl polymerization catalyst and in the absence of mercaptan, the interpolymer being comprised of from about 10 percent to about 30 percent of acrylamide or methacrylamide in units of the structure:

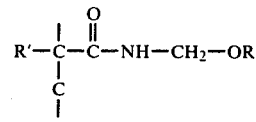

where R' is methyl or hydrogen and R is hydrogen or lower alkyl, from about 5 percent to about 15 percent of units formed by vinyl polymerization of monoethylenically unsaturated carboxylic acid; from about 10 percent to about 30 percent of units derived by vinyl polymerization of monovinyl aromatic monomer; from about 10 percent to about 30 percent of units formed by vinyl polymerization of flexibilizing monomer selected from lower alkyl acrylates such as ethyl acrylate; and from about 20 percent to about 45 percent of nitrile, such as acrylonitrile; wherein the interpolymer is solubilized by neutralizing acid groups of the interpolymer with a sufficient amount of monomeric amine to produce at least 0.200 milli-equivalents of salt per gram of resin solids; and from about 40 percent to about 95 percent by weight of a liquid medium consisting of a mixture of water-soluble or water-miscible organic solvents and water, wherein at least 60 percent by weight of the mixture is water. These cured coatings are characterized by improved impermeability to lubricants and flavor components and also better resist water at elevated temperature so as to also be useful as an exterior coating.

6 Claims, No Drawings

AQUEOUS CAN COATINGS OF IMPROVED IMPERMEABILITY

The present invention relates to aqueous thermosetting coatings particularly adapted for coating the interior of sanitary cans.

The development of water-based coating compositions for use as internal sanitary liners for metal containers has received considerable recent attention, and one system for providing such coating compositions is set forth in U.S. Pat. No. 3,991,216 issued Nov. 9, 1976. However, typical systems in accordance with the teachings of said patent lack desired film impermeability which is a characteristic which is particularly difficult to obtain when the cured coatings are adequately flexible. This invention is directed to overcoming the inadequacies which characterize these typical systems.

The water-based coating compositions of said patent 3,991,216 consist essentially of aqueous dispersions of amine-solubilized carboxy-functional interpolymers which are formed by the interpolymerization of monoethylenically unsaturated methylocated carboxylic acid amide units, monoethylenically unsaturated carboxylic acid units and a mixture of selected monoethylenically unsaturated monomers providing hardening units and flexibilizing units. The interpolymer is formed by polymerization in the presence of a vinyl polymerization catalyst and in the absence of mercaptan and the acid groups of the interpolymer are neutralized or partially neutralized with enough monomeric amine to produce at least 0.200 milliequivalents of salt per gram of resin solids so that the liquid medium of the coating composition can consist of a mixture of water-soluble or water-miscible organic solvents and water, wherein at least 60 percent by weight of the mixture is water. All proportions herein are by weight unless otherwise specified and the disclosure of said U.S. Pat. No. 3,991,216 is hereby incorporated by reference.

Referring more particularly to the mixture of selected monoethylenically unsaturated monomers providing hardening units and flexibilizing units used in said patent, a typical preferred mixture is provided by styrene and ethyl acrylate. To provide desired cure and water-dispersibility it has been found that about 20% of isobutoxymethyl acrylamide together with about 8.5% acrylic acid (or 10% of methacrylic acid) is preferred. The balance of styrene and ethyl acrylate is then adjusted to contain enough ethyl acrylate to provide approximate minimum acceptability which is indicated by a wedge bend rating of about 6.5 (on a scale of 1–10 where 10 is perfect and 6 is the lower limit of acceptability). This provides a typical composition containing 45.0% styrene, 25.0% ethyl acrylate, 20.0% isobutoxymethyl acrylamide and 10.0% methacrylic acid. When this interpolymer is prepared as described in U.S. Pat. No. 3,991,216 and applied from aqueous medium and cured, the film is inadequately impermeable, and the measurement of impermeability will now be described.

An impermeable film is needed for two standpoints. First, foods and beverages contain components which provide flavor, and it is desired that these and similar components not be extracted by contact with the film. Second, the metal surface which is coated frequently contains lubricants, and it is desired to prevent these lubricants from passing through the film to contaminate the food or beverage and spoiling the flavor. It is the capacity of agents to move into and through the film which must be measured. Since beverages are primarily contemplated, especially beer, it is convenient to measure the impermeability of the film by its capacity to pick up and remove the n-heptyl ester of p-hydroxybenzoic acid which is an oily material commonly used to inhibit microbial growth in packaged beer. This agent which is commercially available as Staypro WS-7 is frequently extracted from beer when an off taste is encountered and it is concluded that coatings which extract "Staypro" will also extract flavor-producing constituents and allow oily lubricants to migrate.

This Staypro is easily tracked using the following procedure.

Water containing 8% of ethyl alcohol has 12 ppm (parts per million) of Staypro added thereto and 200 cc of this solution is used for test. 25 square inches of aluminum foil coated with the coating under test on one side thereof is immersed in the solution and held therein at 75° F. for 7 days. The amount of Staypro in the solution is ascertained by preparing a series of standard solutions containing various amounts of Staypro to see how much each of these absorb at 255 m$\mu$. The absorbance of the test solution at 255 m$\mu$ at the end of 7 days is then measured and compared with the standards.

As will be evident, if none of the Staypro is absorbed, the final Staypro concentration will be 12 ppm, the same as at the start, so a Staypro rating of 12 indicates total impermeability. In contrast, complete absorption is indicated by a final Staypro concentration of 0 ppm, so a Staypro rating of 0 indicates total permeability.

The test is a difficult one as can be judged from the fact that aqueous systems containing typical acrylic copolymers in admixture with aminoplast resins provide a Staypro rating of less than 1 (0.7–0.8 is usual). These same aqueous systems exhibit poor resistance to water at the elevated temperatures which are encountered in the processing of sanitary cans. The aqueous coatings of this invention exhibit excellent processing resistance and it is concluded that processing resistance also requires a high degree of film impermeability which is the factor measured by the Staypro rating.

The styrene-ethyl acrylate-isobutoxymethyl acrylamide-methacrylic acid interpolymer described previously and which typifies performance in accordance with said U.S. Pat. No. 3,991,216 has a Staypro rating of 3.7. In this invention a Staypro rating of at least about 6 is desired, preferably at least about 9.

In accordance with this invention, the monomer mixtures contemplated by said U.S. Pat. No. 3,991,216 are modified by the addition of from about 20% to about 45% of a monoethylenic nitrile selected from acrylonitrile and methacrylonitrile. Acrylonitrile is preferred. Comparative data which shows the new result is set forth in Table I, the wedge bend rating being of significance as previously noted and being included in the table.

Table I

| | Monomer, Wt.% | | | | Staypro | Wedge Bend |
|---|---|---|---|---|---|---|
| AN | STY | EA | IBMAM | MAA | Rating | Rating |
| 1-0 | 35 | 35 | 20 | 10 | 3.2 | 5 |
| 2-10 | 30 | 30 | 20 | 10 | 5.2 | 7 |
| 3-20 | 25 | 25 | 20 | 10 | 8.6 | 6 |
| 4-30 | 20 | 20 | 20 | 10 | 10.9 | 5 |
| 5-40 | 15 | 15 | 20 | 10 | 12.0 | 4 |
| 6-0 | 45 | 25 | 20 | 10 | 3.7 | 6.5 |
| 7-30.5 | 20.3 | 20.3 | 20.3 | 8.5* | 10.2 | 6.5 |
| 8-30 | 20 | 23** | 20 | 7.0* | 4.1 | 5.0 |

In the above table, AN=acrylonitrile, STY=styrene, EA=ethyl acrylate, IBMAM=isobutoxymethyl acrylamide and MAA=methacrylic acid.

Runs 1-5 show the progression using an equiweight mixture of styrene and ethyl acrylate and increasing the acrylonitrile content. At about 20% acrylonitrile content the Staypro rating began to be satisfactory and it improved with further increase in the proportion of acrylonitrile. Of course, the wedge bend rating suffers at the higher proportion of acrylonitrile, and this limits the maximum proportion thereof depending upon how much flexibility is demanded. If a 6.5 wedge bend rating is insisted upon, then run 6 represents typical practice of U.S. Pat. No. 3,991,216 as previously noted, and run 7 illustrates preferred practice in this invention. The asterisk in run 7 (also run 8) indicates that acrylic acid was used for better water dispersibility and wedge bend rating, but methacrylic acid provides a better Staypro rating (contrast runs 4 and 7 which are at equimolar ratios). The importance of using acrylate esters for flexibility rather than methacrylate esters can be seen by contrasting run 4 with run 8 where the double asterisk indicates use of n-butyl methacrylate.

With the data of Table I in mind, this invention uses an interpolymer of monomer components as tabulated in Table II.

Table II

| Monoethylenic Monomer Type | Illustration | Proportions % | Preferred Proportions % |
|---|---|---|---|
| 1- nitrile | acrylonitrile*, methacrylonitrile | 20-45 | 25-40 |
| 2- vinyl aromatic | styrene*, p-methyl styrene, vinyl toluene | 10-30 | 15-25 |
| 3- flexibilizing C$_1$-C$_4$ acrylate | methyl, ethyl* propyl or butyl acrylate | 10-30 | 15-25 |
| 4- N-methylol amide | N-methylol acrylamide, acrylamide or ether thereof such as the propyl, butyl, or isobutyl* ether | 10-30 | 15-25 |
| 5- carboxyfunctional | acrylic acid*, methacrylic acid, crotonic acid, fumaric acid, itaconic acid | 5-15 | 7-12 |

The asterisks in the above table indicate materials which are presently preferred.

These monomers are formed into an interpolymer in the presence of a vinyl polymerization catalyst and in the absence of mercaptan, as described in U.S. Pat. No. 3,991,216, polymerization in organic solvent solution being preferred. From about 5% to about 60% of the aqueous coating composition is constituted by the interpolymer either partially or completely neutralized by amine to provide a salt content as noted previously. Correspondingly, from about 40% to about 95% of the coating composition is provided by a liquid medium consisting of water-soluble or water-miscible solvents and water (at least 60% water).

Appropriate solvents and amines are disclosed in said U.S. Pat. No. 3,991,216.

While ethers of N-methylol acrylamide or methacrylamide with lower alcohols as in patent 3,991,216 are preferred, it is also possible to use the same monomers without etherification since the ether groups are removed on baking to regenerate the n-methylol group for cure.

A typical interpolymer in accordance with this invention is prepared and applied as follows:

EXAMPLE A

Into a 3 liter roundbottom flask equipped with reflux condenser, heating means, stirrer, thermometer and inert gas blanket were charged 200 g of 2-butoxyethanol and 350 g of n-butanol. After heating to reflux, a mixture of 200 g isobutoxymethacrylamide, 200 g styrene, 200 g ethyl acrylate, 300 g acrylonitrile, 83.7 g acrylic acid and 25 g t-butylperbenzoate was added over 3 hours. After the addition was complete, the reaction was held at reflux for one hour then an additional 5 g of t-butyl perbenzoate and 100 g n-butanol were added and reflux was held for two hours. A dispersion was obtained by adding 40 g dimethylaminoethanol followed by 2130 g water under rapid agitation.

To 2500 g of the resulting dispersion was added 443 g water. Then 680 g of distillate was stripped off. The solvent composition is then adjusted by adding 100 g isopropanol and 60 g n-butanol.

The product had a solids content of 25 percent and viscosity of 21 centipoise. Applied to aluminum substrate and cured 75 sec. at 360° F., very good film properties were obtained. Very good to excellent flavor was also achieved in conact with both beer and distilled water after pasteurization for 45 minutes at 145° F. and storage for 1-3 days at roomtemperature. A similar, but acrylonitrile free coating, was rated only good to very good in this same test.

EXAMPLE B

Into a 3 liter roundbottom flask equipped as in Example A, were charged 800 g of 2-methoxyethanol and 200 g of a premix composed of 200 g isobutoxymethacrylamide, 200 g styrene, 200 g ethyl acrylate, 300 g acrylonitrile, 83.7 g acrylic acid and 25 g 2,2' azobis (isobutyronitrile). The mixture was brought to 90° C. and, at this temperature the remainder of the premix was added over a period of 5 hours. Five grams additional, 2,2' azobis (isobutyronitrile) was added and temperature was held one additional hour. A 5 g portion of t-butylperbenzoate was then added and the temperature was allowed to rise to the reflux for two hours. A second 5 g portion of t-butyl perbenzoate was added and reflux was held two additional hours to complete the polymerization.

To prepare an aqueous dispersion, 171.4 g of the above polymer solution was transferred to a smaller vessel. It was heated to 60° C. and 20.3 g n-butanol was added. After the mixture became uniform, a solution of 3.4 g ammonia (28%) in 30 g of water was added followed by 174.3 g water. A dispersion was easily formed having a solids content of 30% and viscosity of 150 cp at 25° C. The product, applied to aluminum substrate and baked 2 minutes at 400° F., gave films of excellent appearance, adhesion and solvent resistance.

The Staypro rating obtained in both of these examples is about 10.5. These same aqueous coatings provide excellent resistance to exposure to high temperature water (liquid and vapor) as is encountered in the processing of sanitary cans which is normally carried out at a temperature in the range of 240°-250° F. For this reason, these impenetrable coatings of this invention are of value in the coating of the exterior of sanitary cans.

We claim:

1. A metal container containing a beverage or food and having its internal surface coated with an adherent sanitary liner, the coating which is in contact with said food or beverage having a Staypro value of at least about 6 and being a cured layer of a water-based coating composition consisting essentially of:
   (A) from about 5 percent to about 60 percent by weight of an amine-neutralized or partially neutralized interpolymer formed in the presence of a vinyl polymerization catalyst and in the absence of mercaptan, said interpolymer being comprised of:
   1. from about 10 percent to about 30 percent of acrylamide or methacrylamide in units of the structure:

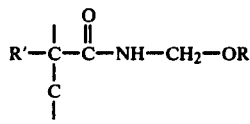

where R' is methyl or hydrogen and R is hydrogen or lower alkyl;
   2. from about 5 percent to about 15 percent of units formed by vinyl polymerization of monoethylenically unsaturated carboxylic acid;
   3. from about 10 percent to about 30 percent of units derived by vinyl polymerization of monovinyl aromatic monomer;
   4. from about 10 percent to about 30 percent of units formed by vinyl polymerization of flexibilizing monomer selected from alkyl acrylates having up to 4 carbon atoms in each alkyl group; and
   5. from about 20 percent to about 45 percent of nitrile selected from acrylonitrile and methacrylonitrile; wherein said interpolymer is solubilized by neutralizing or partially neutralizing the acid groups of said interpolymer with a sufficient amount of monomeric amine to produce at least 0.200 milliequivalents of salt per gram of resin solids; and
   (B) from about 40 percent to about 95 percent by weight of a liquid medium consisting of a mixture of water-soluble or water-miscible organic solvents and water, wherein at least 60 percent by weight of the mixture is water.

2. The container of claim 1 wherein said container contains a beverage selected from the group consisting of beer, carbonated soft drinks, non-carbonated soft drinks, and fruit juice.

3. The container of claim 1 in which at least 50 percent of the groups represented by R are lower alkyl, said nitrile is acrylonitrile, said acid is selected from acrylic acid and methacrylic acid and said aromatic monomer is styrene.

4. The container of claim 3 in which said alkyl acrylate is ethyl acrylate.

5. A metal container containing a beverage or food and having its internal surface coated with an adherent sanitary liner, the coating which is in contact with said food or beverage having a Staypro value of at least about 6 and being a cured layer of a water-based coating composition consisting essentially of:
   (A) from about 5 percent to about 60 percent by weight of an amine-neutralized or partially neutralized interpolymer formed in the presence of a vinyl polymerization catalyst and in the absence of mercaptan, said interpolymer being comprised of:
   1. from 15 percent to 25 percent of acrylamide or methacrylamide in units of the structure:

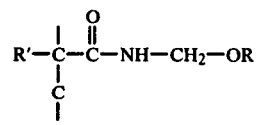

where R' is methyl or hydrogen and R is hydrogen or $C_1$-$C_4$-alkyl, at least 50% of which is $C_1$-$C_4$-alkyl;
   2. from 7 percent to 12 percent of units formed by vinyl polymerization of monoethylenically unsaturated carboxylic acid selected from acrylic acid, methacrylic acid, crotonic acid, itaconic acid or fumaric acid;
   3. from 15 percent to 25 percent of units derived by vinyl polymerization of styrene;
   4. from 15 percent to 25 percent of units formed by vinyl polymerization of flexibilizing monomer selected from alkyl acrylates having up to 4 carbon atoms in each alkyl group; and
   5. from 25 percent to 40 percent of acrylonitrile; wherein said interpolymer is solubilized by neutralizing or partially neutralizing the acid groups of said interpolymer with a sufficient amount of monomeric amine to produce at least 0.200 milliequivalents of salt per gram of resin solids; and
   (B) from about 40 percent to about 95 percent by weight of a liquid medium consisting of a mixture of water-soluble or water-miscible organic solvents and water, wherein at least 60 percent by weight of the mixture is water.

6. The container of claim 5 wherein said container contains a beverage selected from the group consisting of beer, carbonated soft drinks, non-carbonated soft drinks, and fruit juice.

* * * * *